United States Patent
Vandame (10) Patent No.: US 8,615,134 B2
(45) Date of Patent: Dec. 24, 2013

(54) METHOD AND A DEVICE FOR IDENTIFYING A SET OF PIXELS, THE VALUES OF WHICH ARE INTENDED TO BE USED TO DETERMINE THE VALUE OF A TARGET PIXEL

(75) Inventor: Benoît Vandame, Betton (FR)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 12/741,557

(22) PCT Filed: Nov. 7, 2008

(86) PCT No.: PCT/EP2008/065169
§ 371 (c)(1),
(2), (4) Date: Jul. 6, 2010

(87) PCT Pub. No.: WO2009/060082
PCT Pub. Date: May 14, 2009

(65) Prior Publication Data
US 2010/0266211 A1    Oct. 21, 2010

(30) Foreign Application Priority Data
Nov. 9, 2007 (FR) ..................... 07 07853

(51) Int. Cl.
*G06K 9/48* (2006.01)
(52) U.S. Cl.
USPC ............ 382/199; 382/289; 382/275; 382/300
(58) Field of Classification Search
USPC .................. 382/199, 289, 275, 300
See application file for complete search history.

(56) References Cited

U.S. PATENT DOCUMENTS

| 2006/0133698 A1 | 6/2006 | Kim et al. ...................... 382/300 |
| 2007/0047838 A1 | 3/2007 | Milanfar et al. ............... 382/289 |
| 2010/0021079 A1 | 1/2010 | Ouedraogo et al. .......... 382/275 |

FOREIGN PATENT DOCUMENTS

EP    0 778 543 A2    6/1997

OTHER PUBLICATIONS

Lee: "Refined filtering of images noise using local statistics", Computer Graphics and Image Processing, 1981.*
W. Kwok et al., "Multi-Directional Interpolation for Spatial Error Concealment," IEEE Transactions on Consumer Electronics, vol. 39, No. 3, pp. 455-460, Aug. 1993.
R. Mehrotra et al., "Corner Detection," Pattern Recognition, vol. 23, No. 11, pp. 1223-1233, 1990.

(Continued)

*Primary Examiner* — Ruiping Li
(74) *Attorney, Agent, or Firm* — Fitzpatrick, Cella, Harper & Scinto (57) ABSTRACT

A method and device identify from plural sets of pixels of a digital image, a set of pixels whose values are to be used in image processing to determine a target-pixel value. The method and device: obtain a pixel set comprising solely the target pixel and first and second pixel subsets extending along only first and second directions, respectively, each pixel of the pixel set being contiguous with another pixel of the set; obtaining first and second measures being, respectively, measures of an angle difference between the first direction and the gradient of a pixel of the first subset, and of an angle difference between the second direction and the gradient of a pixel of the second subset; and determining whether the obtained set of pixels is the pixel set whose values determine the value of the target pixel, in accordance with the first and second measures.

20 Claims, 5 Drawing Sheets

(56) References Cited

OTHER PUBLICATIONS

M.I. Gurelli et al., "A Class of Adaptive Directional Image Smoothing Filters," Pattern Recognition, vol. 29, No. 12, pp. 1995-2004, 1996.

David Tschumperlé, "Fast Anisotropic Smoothing of Multi-Valued Images using Curvature-Preserving PDE's," International Journal of Computer Vision, vol. 68, No. 1, pp. 65-82, Jun. 2006.

H. Takeda et al., "Kernel Regression for Image Processing and Reconstruction," IEEE Transactions on Image Processing, vol. 16, No. 2, Feb. 2007, pp. 349-366.

D. Stalling et al., "Fast and resolution Independent Line Integral Convolution," ZIB, Preprint SC-94-37 (Jun. 1995), pp. 1-22.

D. Tschumperlé, "LIC-Based Regularization of Multi-valued Images,"—4 pages.

P. Perona et al., "Scale-Space and Edge Detection Using Anisotropic Diffusion," IEEE Transaction on Pattern Analysis and Machine Intelligence, vol. 12, No. 7, Jul. 1990, pp. 629-639.

B. Cabral et al., "Imaging Vector Fields Using Line Integral Convolution," Lawrence Livermore National Laboratory—8 pages.

\* cited by examiner

Fig. 5c

METHOD AND A DEVICE FOR IDENTIFYING A SET OF PIXELS, THE VALUES OF WHICH ARE INTENDED TO BE USED TO DETERMINE THE VALUE OF A TARGET PIXEL

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a method and a device for identifying a set of pixels, the values of which are intended to be used to determine the value of a target pixel.

The present invention is, for example but not limitingly, applicable in processing systems for the purpose of eliminating the noise present in digital images or in processing systems for the purpose of enhancing the contours in digital images.

2. Description of Related Art Including Information Disclosed Under 37 CFR 1.97 and 1.98

Conventionally, in digital image processing, the values of the pixels of the digital images are determined according to the values of the pixels neighboring the processed pixel. These determinations are conventionally carried out using pixel convolution products. The purpose of these processing operations is to provide an image with less noise, while still preserving the other characteristics of the image.

In practice, noise reduction is generally accompanied by a partial reduction in the textures and/or by a substantial diffusing of the edges or contours and of the salient points within the digital image.

Certain processing methods use what are called "anisotropic" convolutions: a set of neighbouring pixels is determined for each pixel as a function of the values taken by the neighbouring pixels. Such approaches locally adapt the set of pixels used for determining the value of a pixel in order to take into account the characteristics of the processed image. These methods are expensive in terms of computing time and the processing time for small images is typically measured in seconds.

Although useful as regards quality of the image processing, these methods are not suitable for real-time processing of video sequences.

BRIEF SUMMARY OF THE INVENTION

The aim of the invention is to solve the drawbacks of the prior art by proposing a method and a device for identifying a set of pixels, the values of which are intended to be used to determine the value of a target pixel, which is compatible with the real-time constraints on processing video sequences and which prevents substantial diffusing of the edges or contours and of the salient points within the digital images.

For this purpose, according to a first aspect, the invention provides a method of identifying a set of pixels, the values of which are intended to be used to determine the value of a target pixel, the pixels being pixels of a digital image, characterized in that the method comprises the steps of:

determining gradients for at least one plurality of pixels lying close to the target pixel, each gradient being defined by a direction;

obtaining a set of pixels, consisting of the target pixel and at least two pixel subsets, a first pixel subset extending along a first direction and a second pixel subset extending along a second direction, each pixel of the set of pixels being contiguous with another pixel of the set of pixels; and obtaining first and second measures, the first measure being a measure of the angle difference between the first direction and the gradient of at least one pixel of the first pixel subset, the second measure being a measure of the angle difference between the second direction and the gradient of at least one pixel of the second pixel subset; and identifying the set of pixels as the set of pixels, the values of which are intended to be used to determine the value of the target pixel, according to the first and second measures.

Correspondingly, the invention relates to a device for identifying a set of pixels, the values of which are intended to be used to determine the value of a target pixel, the pixels being pixels of a digital image, characterized in that the device comprises:

means for determining gradients for at least one plurality of pixels lying close to the target pixel, each gradient being defined by a direction;

means for obtaining a set of pixels, consisting of the target pixel and at least two pixel subsets, a first pixel subset extending along a first direction and a second pixel subset extending along a second direction, each pixel of the set of pixels being contiguous with another pixel of the set of pixels; and means for obtaining first and second measures, the first measure being a measure of the angle difference between the first direction and the gradient of at least one pixel of the first pixel subset, the second measure being a measure of the angle difference between the second direction and the gradient of at least one pixel of the second pixel subset; and means for identifying the set of pixels as the set of pixels, the values of which are intended to be used to determine the value of the target pixel, according to the first and second measure.

Thus, the edges or the contours or the salient points within a digital image are not diffuse.

According to another aspect of the invention, the normal of the direction of a pixel subset does not intersect the gradient direction of any pixel within the pixel subset if the angle between the direction of each gradient and the normal of the direction of the pixel subset has a value lower than a threshold.

According to another aspect of the invention, the set of pixels is identified according to the first and second measures by checking if the angle between the direction of the gradient of each pixel of the first pixel subset and the normal of the direction of the first pixel subset has a value lower than a threshold and if the angle between the direction of the gradient of each pixel of the second pixel subset and the normal of the direction of the second pixel subset has a value lower than a threshold.

According to another aspect of the invention, each gradient is furthermore defined by a norm and the threshold is determined from the norms of the gradients determined.

According to another aspect of the invention:

a first set of pixels, the directions of the first and second pixel subsets of which are opposed and orthogonal to the gradient of the target pixel is selected;

for each pixel of the first pixel subset, a coefficient is calculated from the norm of the gradient of the pixel and from the angle between the direction of the gradient of the pixel and the normal of the direction of the first pixel subset;

a coefficient associated with the first pixel subset is calculated from the coefficients calculated for each pixel of the first pixel subset;

the coefficient associated with the first pixel subset is compared with the threshold; and if the coefficient associated with the first pixel subset is greater than the threshold, a second set of pixels, the direction of the first pixel subset of which is different from the direction of the first pixel subset of the first set of pixels, is selected.

Thus, the operation of determining the set of pixels is carried out in a simple manner. By choosing a set of pixels consisting of two pixel subsets extending in two directions, it is possible, by adjusting one of the directions, to rapidly obtain a set of pixels the form of which is adapted to the values of the pixels neighbouring the target pixel, the value of which is to be determined.

According to another aspect of the invention:

for each pixel of the second pixel subset, a coefficient is calculated from the norm of the gradient of the pixel and from the angle between the direction of the gradient of the pixel and the normal of the direction of the second pixel subset;

a coefficient associated with the second pixel subset is calculated from the coefficients calculated for each pixel of the second pixel subset;

the coefficient associated with the second pixel subset is compared with the threshold; and if the coefficient associated with the second pixel subset is greater than the threshold, a second set of pixels, the direction of the second pixel subset of which is different from the direction of the second pixel subset of the first set of pixels, is selected.

Thus, the operation of determining the set of pixels is carried out in a simple manner. By choosing a set of pixels consisting of two pixels subsets extending in two directions, it is possible, by adjusting two directions, to rapidly obtain a set of pixels the form of which is adapted to the values of the pixels neighbouring the target pixel the value of which is to be determined.

According to another aspect of the invention, the direction determination and the selection are divided into:

calculating the value of an angle associated with the first pixel subset from the direction of the gradient of each pixel of the first pixel subset; and calculating the value of an angle associated with the second pixel subset from the direction of the gradient of each pixel of the second pixel subset, and the second set of pixels is selected from the values of the angles associated with the pixel subsets.

Thus, the determination of the set of pixels is carried out rapidly. The selection method according to the present invention is compatible with the real-time constraints associated with video sequences.

According to another aspect of the invention, an index is associated with each set of pixels and the second set of pixels selected is the set of pixels whose index corresponds to a value calculated from the values of the angles associated with the pixel subsets.

Thus, the determination of the set of pixels is carried out rapidly. The selection method according to the present invention is compatible with the real-time constraints associated with video sequences.

According to another aspect of the invention, the subsets contain the same number of pixels.

Thus, the determination of the set of pixels is carried out rapidly. The selection method according to the present invention is compatible with the real-time constraints associated with video sequences.

According to another aspect of the invention, the calculation and selection substeps are iterated at most a predetermined number of times for the target pixel.

Thus, the determination of the set of pixels is carried out rapidly. The selection method according to the present invention is compatible with the real-time constraints associated with video sequences.

According to another aspect of the invention, if the calculation and selection substeps are carried out the predetermined number of times for the target pixel and if the coefficients associated with the pixel subsets have a similar value between the iterations, the number of pixels within at least one of the subsets is reduced.

Thus, the present invention is capable of taking into account singular pixels of a digital image.

According to another aspect of the invention, each set of pixels furthermore consists of at least a third and a fourth pixel subset, the third pixel subset extending along a third direction and the fourth pixel subset extending along a fourth direction, and the set of pixels is identified as the set of pixels the values of which are intended to be used to determine the value of the target pixel if angle between the direction of the gradient of each pixel of the third pixel subset and the normal of the direction of the third pixel subset has a value lower than a threshold and if the angle between the direction of the gradient of each pixel of the fourth pixel subset and the normal of the direction of the fourth pixel subset has a value lower than the threshold.

According to another aspect of the invention, a pixel of the first pixel subset and a pixel of the second pixel subset are contiguous with the target pixel.

According to another aspect, the direction along which the first pixel subset extends is determined from the target pixel and the direction along which the second pixel subset extends is determined from the target pixel.

According to another aspect of the invention, the value of the target pixel is determined from the values of the pixels of the selected set of pixels.

Thus, the quality of the digital image is improved.

According to another aspect of the invention, the present invention is carried out for each pixel of the digital image.

Thus, the quality of the digital image is improved.

The invention also relates to a method of restoring a digital image comprising a set of pixels represented by a plurality of grey levels. The method advantageously comprises, for at least one target pixel, the steps of:

identifying a set of pixels the values of which are intended to be used to determine the value of the target pixel, by applying an identification method as described above; and determining the value of the target pixel from the values of the pixels of the selected set of pixels.

The invention also relates to the computer program stored on an information medium, the program comprising instructions for implementing the method described above when it is loaded and executed by a calculating system.

BRIEF DESCRIPTION OF THE SEVERAL VIEWS OF THE DRAWINGS

The features of the invention mentioned above, and also others, will become more clearly apparent on reading the following description of an exemplary embodiment, said description referring to the appended drawings in which.

DETAILED DESCRIPTION OF THE INVENTION

Figure 1:
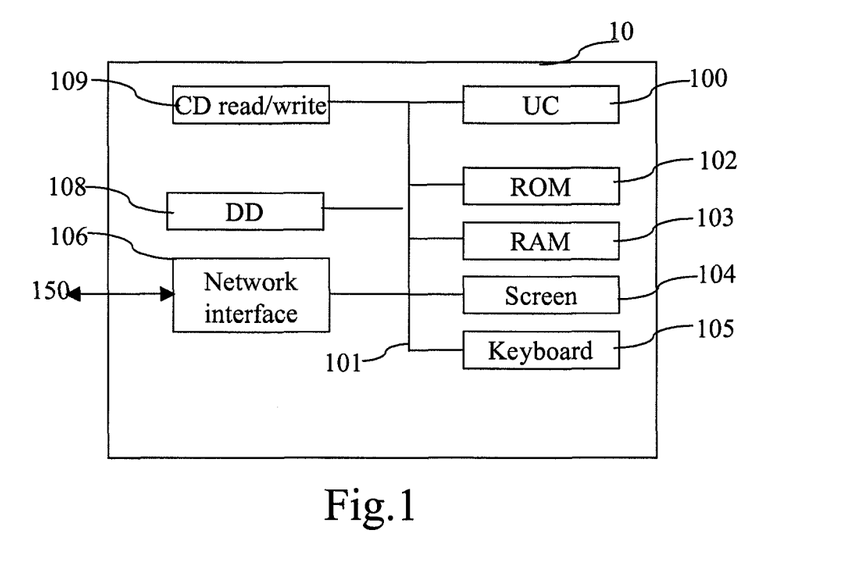
FIG. 1 shows a selection device, for identifying, from a plurality of sets of pixels, a set of pixels the values of which are intended to be used to determine the value of a target pixel.

FIG. 1 shows a device for identifying, from a plurality of sets of pixels, a set of pixels the values of which are intended to be used to determine the value of a target pixel.

The identification method is, in a preferred embodiment of the invention, performed by a selecting device, identifying in a plurality of sets of pixels, a set of pixels, the values of which are to be used to determine the value of a pixel.

The identification device will hereafter be named selection device 10.

The selection device 10 is for example a computer that includes a communication bus 101 to which the following are connected: a central processing unit CPU 100, a read-only memory ROM 102, a random-access memory RAM 103, a screen 104, a keyboard 105, an interface 106 for communication with a telecommunication network 150, a hard disk HD 108 and a read/write drive 109 for reading data from and writing data on a removable medium.

It should be pointed out here that, as a variant, the selection device 10 consists of one or more dedicated integrated circuits that are capable of implementing the method as described with reference to FIGS. 2 and 3. These integrated circuits are, for example but not limitingly, integrated into a fixed or video image recording apparatus so as to optimize the quality of the image acquired or into an apparatus for displaying the image, such as a screen or a printer, so as to compensate for the defects in transmitting the image or the video received.

The read-only memory ROM 102 stores inter alia the program for implementing the method of the invention, which will be subsequently described with reference to FIGS. 2 and 3.

More generally, the program according to the present invention is stored in a storage means. This storage means can be read by a computer or a microprocessor 100. This storage means may or may not be integrated into the selection device 10 and it may be removable.

When the selection device 10 is turned on, or upon starting the software for selecting a set of pixels, the program according to the present invention is transferred from the read-only memory ROM 102 to the random-access memory RAM 103, which then contains the executable code of the invention and the data needed to implement the invention.

The selection device 10 also includes a screen 104 capable of reproducing the information representative of the processing carried out on the digital images.

By means of the keyboard 105 and the screen 104, the user selects a digital image or a portion of a digital image to be processed.

Of course, the keyboard 105 may be replaced or supplemented with a man/machine interface such as a mouse.

The network interface 106 is used to receive digital images to be processed or to transfer, via the telecommunication network 150, processed digital images.

The hard disk 108 stores the digital images processed or to be processed by the present invention. The hard disk 108 also stores, as a variant, the program for implementing the invention, which will be described subsequently with reference to FIGS. 2 and 3.

The read/write device 109 enabling reading data from and writing data on a removable storage mean is, for example, a compact disk read/write device. The data read/write device 109 is capable of reading the program according to the present invention on a removable storage mean in order to transfer the program onto the hard disk 108. The data read/write device 109 is also capable of storing the processed digital images on such removable information medium.

Figure 2:
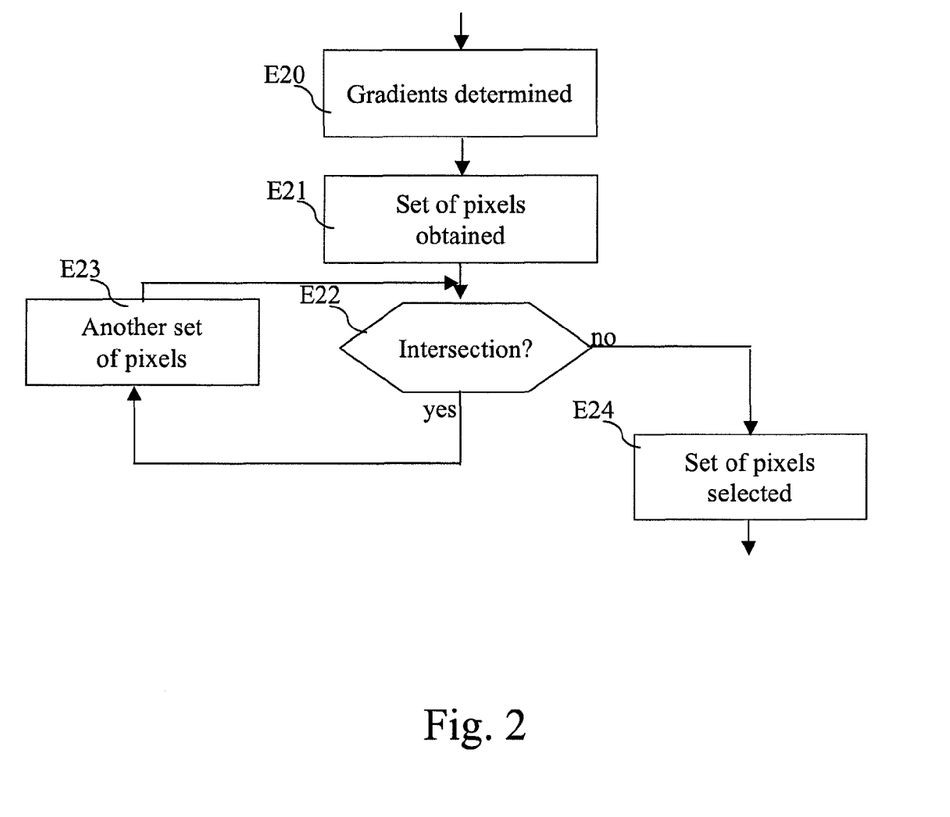
FIG. 2 shows a selection algorithm for identifying, from a plurality of sets of pixels, a set of pixels the values of which are intended to be used to determine the value of a target pixel.

FIG. 2 shows a selection algorithm for identifying, from a plurality of sets of pixels, a set of pixels the values of which are intended to be used to determine the value of a target pixel.

More precisely, the present algorithm is executed by the processor 100 of the selection device 10.

The present algorithm is executed for at least some of the pixels of a digital image to be processed. Preferably, the present algorithm is executed for each pixel of the digital image to be processed. Preferably, the algorithm is applied to the luminance of the digital image to be processed, the luminance of each pixel being represented on a predetermined number, for example 256, of grey levels.

In step E20, the processor 100 determines the gradients of each pixel of the image to be processed.

The gradients are for example determined from the Sobel method, which provides convolution by square masks of three pixels for each side.

Preferably, the gradient of each pixel denoted by $x_{i,j}$, in which i is the index of the pixel on the horizontal axis and j is the index of the pixel on the vertical axis, is determined by calculating the derivative $I_{hi,j}$ of the value of the pixels relating to the pixel and lying on the same horizontal line as the pixel $x_{i,j}$ and by calculating a second derivative $I_{vi,j}$ of the values of the pixels relating to the pixel $x_{i,j}$ and lying on the same vertical line as the pixel $x_{i,j}$.

Thus, in this example for a pixel of value $x_{i,j}$, $I_{hi,j}=(x_{i+1,j}-x_{i-1,j})/2$ and $I_{vi,j}=(x_{i,j+1}-x_{i,j-1})/2$.

The gradient of a pixel is characterized by its direction and its norm. The direction of the gradient of the pixel $x_{i,j}$ is given by $$I_{\varphi i,j} = \arctan\left(\frac{I_{vi,j}}{I_{hi,j}}\right)$$

and the norm of the gradient of the pixel $x_{i,j}$ is given by $I_{Ni,j} = \sqrt{I_{hi,j}^2 + I_{vi,j}^2}$.

The direction and the norm of each pixel gradient are stored in the RAM memory 103.

In other words, in this example, $I_{hi,j}$ and $I_{vi,j}$ are calculated by a horizontal one-dimensional convolution and a vertical one-dimensional convolution respectively. The three convolution coefficients are, in this example: [-½, 0, ½] for both convolutions.

In step E21, the processor 100 obtains a set of pixels. In this example of implementation, the set of pixels is taken from a plurality of sets of pixels.

A set of pixels consists, according to the present invention, of the target pixel the value of which is to be determined, a first pixel subset and a second pixel subset, the first pixel subset extending along a first direction and the second pixel subset extending along a second direction.

The direction along which each subset extends is determined from the target pixel, as shown below with reference to FIGS. 4*a* to 4*h*.

Preferably, the two directions are non-opposed directions, that is to say the directions are separated by an angle different from 180°.

Figure 4A:
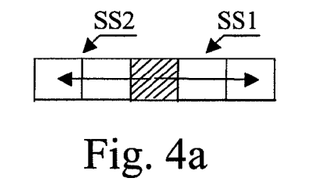
FIGS. 4a to 4h show various examples of sets of pixels according to the present invention.
Figures 4B, 4D, 4E, 4G:
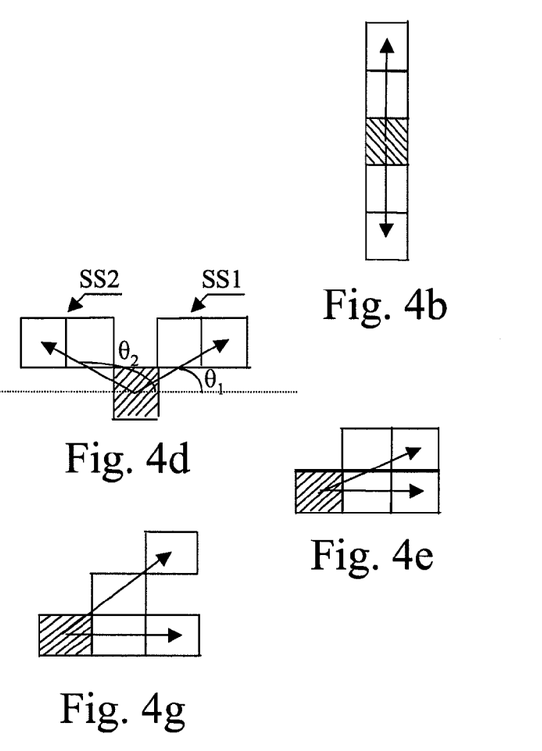
Figure 4C:
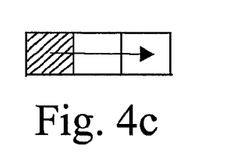
Figure 4F:
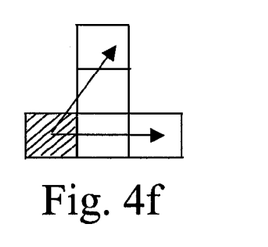

Examples of sets of pixels are given in FIGS. 4*a* and 4*f*.

In step E22, the processor 100 obtains first and second measures, the first measure being a measure of the angle difference between the first direction and the gradient of at least one pixel of the first pixel subset, the second measure being a measure of the angle difference between the second direction and the gradient of at least one pixel of the second pixel subset. These measures are intended to be used in the further step E24 for the identification of the set of pixels the values of which are intended to be used to determine the value of the target pixel.

In the preferred embodiment, the processor checks whether the angle between the direction of the gradient of each pixel of the first pixel subset and the normal of the direction of the first pixel subset has a value lower than a threshold and if the angle between the direction of the gradient of each pixel of the second pixel subset and the normal of the direction of the second pixel subset has a value lower than the threshold.

If the angle between the direction of the gradient of each pixel of the first pixel subset and the normal of the direction of the first pixel subset has a value lower than the threshold and if the angle between the direction of the gradient of each pixel of the second pixel subset and the normal of the direction of the second pixel subset has a value lower than the threshold, the processor 100 passes to step E24 and identifies the set of pixels as the set of pixels the values of which are intended to be used to determine the value of the target pixel.

After carrying out this step, the processor 100 considers a new pixel the value of which is to be processed and returns to step E21.

If the angle between the direction of the gradient of at least one pixel of the first pixel subset and the normal of the direction of the first pixel subset has a value greater or equal to the threshold or if the angle between the direction of the gradient of at least one pixel of the second pixel subset and the normal of the direction of the second pixel subset has a value greater or equal to the threshold, the processor 100 passes to step E23, selects another set of pixels, and returns to step E22.

Figure 3:
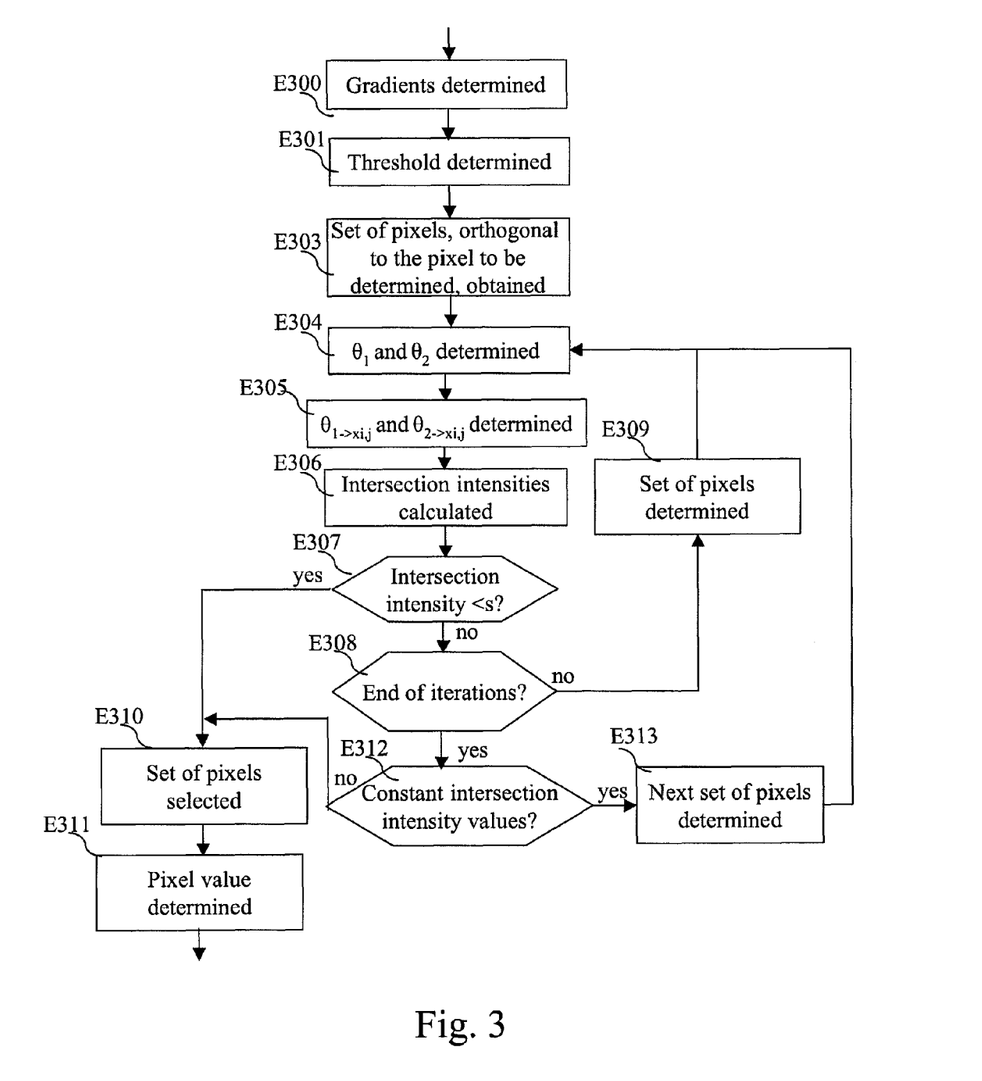
FIG. 3 shows an identification algorithm for selecting, from a plurality of sets of pixels, a set of pixels the values of which are intended to be used to determine the value of a target pixel according to one particular embodiment of the present invention.

FIG. 3 shows an algorithm identifying a set of pixels the values of which are intended to be used to determine the value of a target pixel according to a particular embodiment of the present invention.

More precisely, the present algorithm is executed by the processor 100 of the selection device 10.

The present algorithm is executed for at least some of the pixels of a digital image to be processed. Preferably, the present algorithm is executed for each pixel of the digital image to be processed.

In step E300, the processor 100 determines the gradients of each pixel of the image to be processed in the manner as described in step E20 of the algorithm of FIG. 2.

In the next step E301, the processor 100 determines a threshold denoted by s, by a statistical study of the values of the previously calculated gradient norms. The statistics are for example based on the mean and the variance of the gradient norms. Denoting the mean and the variance of the gradient norms by $\mu$ and $\sigma$ respectively, means that the threshold s can be equal to $s = \mu + k\sigma$, where k is the thresholding coefficient taking, for example, the value 2 or 3.

It should be pointed out here that calculating the threshold s is suitable for images having a globally uniform level of noise over the image. If this level of noise varies over the image, or if, for certain regions of the image, low-contrast details are more important, it would then be appropriate to consider a threshold s for each pixel of the image.

As a variant, the threshold s has a predetermined value.

In step E303, the processor 100 obtains a set of pixels from a plurality of sets of pixels.

Preferably, the set of pixels is obtained by selecting a set of pixels the directions of the first and second pixel subsets of which are opposed and orthogonal to the direction of the gradient of the target pixel. Thus, this selection is made in a simple and systematic manner.

The set of pixels selected is the set of pixels as shown in FIG. 4*a* if the direction of the gradient of the target pixel is vertical.

In FIG. 4*a*, the direction of the first pixel subset SS1 is opposed to the direction of the second pixel subset SS2.

The target pixel is the hatched pixel.

If the direction of the gradient of the target pixel is horizontal, the selected set of pixels is the set of pixels shown in FIG. 4*b*.

FIGS. 4*c* to 4*g* show various examples of sets of pixels according to the present invention.

The target pixel is the hatched pixel, and the first and second pixel subsets extend along the same direction as that shown in FIG. 4*c* or extend along different directions.

A pixel of the first pixel subset and a pixel of the second pixel subset are contiguous with the target pixel.

Figure 4H:
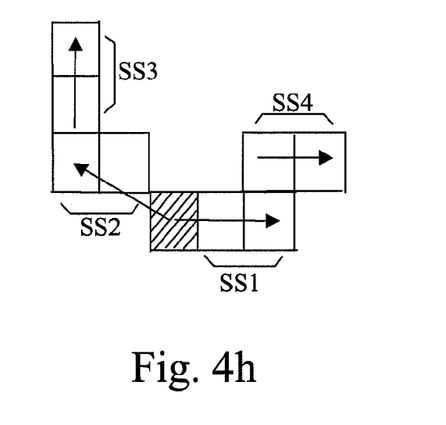

FIG. 4*h* shows the example of a set of pixels formed from four pixel subsets SS1, SS2, SS3 and SS4, of sets of pixels according to the present invention.

The target pixel is the hatched pixel, and the first and second pixel subsets extend along different directions and the third and fourth pixel subsets extend along different directions.

A pixel of the first pixel subset and a pixel of the second pixel subset are contiguous with the target pixel.

In the next step E304, the processor 100 determines the angle $\theta_1$ representative of the direction of the first pixel subset SS1 and the angle $\theta_2$ representative of the direction of the second pixel subset SS2. The angles $\theta_1$ and $\theta_2$ are with respect to the horizontal shown by a broken line in FIG. 4*d*. The angles $\theta_1$ and $\theta_2$ are associated with the shape of the set selected. In other words, by knowing the selected set, $\theta_1$ and $\theta_2$ are known. The values of $\theta 1$ and $\theta 2$ associated with each shape are, for example, stored in advance in the memory 103, and read from the memory 103 at the step E304.

In the next step E305, the processor 100 determines, for each pixel $x_{i,j}$ of the first pixel subset, the angle $\theta_{1 \to xi,j}$ formed between the normal of the first pixel subset and the direction $I_{\varphi i,j}$ of the gradient of the pixel $x_{i,j}$.

In other words, the processor 100 calculates, for each pixel $x_{i,j}$ of the first pixel subset, the angle $\theta_{1 \to xi,j} = \theta_1 + 90° - I_{\varphi i,j}$.

In this same step, the processor 100 determines, for each pixel $x_{i,j}$ of the second pixel subset, the angle $\theta_{2 \to xi,j}$ formed between the normal of the second pixel subset and the direction $I_{\varphi i,j}$ of the gradient of the pixel $x_{i,j}$.

In other words, the processor 100 calculates, for each pixel $x_{i,j}$ of the second pixel subset, the angle $\theta_{2 \to xi,j} = \theta_2 + 90° - I_{\varphi i,j}$.

In the next step E306, the processor 100 calculates, for each pixel of the first pixel subset, a coefficient from the norm of the gradient of the pixel and from the angle between the direction of the gradient of the pixel and the normal of the direction of the first pixel subset.

The coefficient $IC_{xi,j}$ or the instantaneous intersection intensity at the pixel $x_{i,j}$ of the first subset is equal to: $IC_{xi,j} = g(\theta_{1 \to xi,j}, I_{Ni,j})$.

The function g is an increasing function of $\theta_{1 \to xi,j}$ and $I_{Ni,j}$. For rapid calculation, g is defined as a simple multiplication.

In this same step, the processor 100 calculates a coefficient $IC_1$ associated with the first pixel subset, or intersection intensity, from the coefficients calculated for each pixel of the first pixel subset.

For example, the coefficient $IC_1$ is defined as the mean of the instantaneous intersection intensities $IC_{xi,j}$ at the pixels $x_{i,j}$ of the first pixel subset. As a variant, the coefficient $IC_1$ is calculated from a half-Gaussian function, which gives more weight to the instantaneous intersection intensities close to the target pixel. The coefficient $IC_1$ may also be calculated from a function returning the maximum of the instantaneous intersection intensities. This choice makes it possible to maximize the least error over the subset, and therefore to redefine as best as possible a new orientation of the first pixel subset. This solution is optimal for very noisy images and allows the images to be restored while suitably preserving the contours. h is the weighting function allowing to calculate IC1 where instantaneous intersection intensity $IC_{xi,j}$ is known.

In this same step, the processor 100 calculates, for each pixel of the second pixel subset, a coefficient from the norm of the gradient of the pixel and from the angle between the direction of the gradient of the pixel and the normal of the direction of the second pixel subset.

The coefficient $IC_{xi,j}$ or instantaneous intersection intensity at the pixel $x_{i,j}$ of the second subset is equal to: $IC_{xi,j} = g(\theta_{2 \to xi,j}, I_{Ni,j})$.

The function g is an increasing function of $\theta_{2 \to xi,j}$ and $I_{Ni,j}$. For rapid calculation, g is defined as a simple multiplication.

In this same step, the processor 100 calculates a coefficient $IC_2$ associated with the second pixel subset, or intersection intensity, from the coefficients calculated for each pixel of the second pixel subset.

For example, the coefficient $IC_2$ is defined as the mean of the instantaneous intersection intensities $IC_{xi,j}$ at the pixels $x_{i,j}$ of the second pixel subset. As a variant, the coefficient $IC_2$ is calculated from a half-Gaussian function, which gives more weight to the instantaneous intersection intensities close to the target pixel. The coefficient $IC_2$ may also be calculated from a function returning the maximum of the instantaneous intersection intensities. This choice makes it possible to maximize the least error over a subset, and therefore to redefine as best as possible a new orientation of the second pixel subset. This solution is optimal for very noisy images so as to preserve the contours well. h is the weighting function allowing to calculate $IC_2$ where instantaneous intersection intensity $IC_{xi,j}$ is known.

In step E307, the processor 100 determines whether the coefficients $IC_1$ and $IC_2$ are lower than the threshold s.

If the coefficients $IC_1$ and $IC_2$ are lower than the threshold s, this means that the normal of the direction of the first pixel subset does not intersect the direction of any gradient of a pixel within the first subset significantly within the meaning of the threshold s and that the normal of the direction of the second pixel subset does not intersect the direction of any gradient of a pixel within the second pixel subset significantly within the meaning of the threshold s. In this case, the processor 100 passes to step E310 and selects the set of pixels as the set of pixels the values of which are intended to be used to determine the value of the target pixel.

Steps E303 to E307 were described when the set of pixels consists of two pixel subsets. A person skilled in the art will readily understand the way to adapt the present algorithm when the set of pixels consists of more than two pixel subsets by calculating a coefficient IC for each subset and by checking whether each coefficient IC is lower than the threshold s.

After carrying out this operation, the processor 100 passes to step E311 and determines the value of the target pixel.

The value of the target pixel is determined by carrying out a convolution over the values of the pixels lying within the selected set of pixels with N-point convolution operators, where N represents the number of pixels within the set of pixels. A convolution operator may be a linear convolution associated with coefficients, a median filter, or any other type of filter.

The convolution operators are chosen according to the type of restoration desired for the digital image to be processed. A single operator of the smoothing type can be used for all the pixels of the image to be processed so as to reduce the noise of the digital image. Alternately, a single operator of the enhancement type can be used for all the pixels of the image to be processed so as to enhance the contrast. Fine details and textures become more contrasted, while the contours are preserved.

Two operators, respectively of the enhancement and smoothing type, both of the same size, may also be chosen. The smoothing operator is applied to the pixels having a low gradient norm while the enhancement operator is applied to the other pixels. This combination makes it possible to smooth out the noise in the homogeneous regions and to enhance the significant details in the other regions. This restoration is suitable for slightly noisy images, the details of which it is desired to enhance.

Alternatively, a convolution operator can be defined independently for each pixel $x_{i,j}$ of the image to be processed, according to the intersection intensities calculated for the subsets of pixels selected for pixel $x_{i,j}$ as the target pixel. For instance in a case of a convolution operator defined by a Gaussian smoothing, if the sum of the intersection intensities is small, the variance of the Gaussian function is chosen to be large, thus providing a strong smoothing; by opposition, if the sum of the intersection intensities is large, the variance of the Gaussian function is chosen to be small such that the smoothing is weak in order to preserve the details that are crossed by the selected set of pixels.

The pixels of the digital image may be convoluted one or more times in succession in order to obtain a very pronounced effect. The effect produced preserves the contours or details in which the associated gradients are greater than s. The other details of lower contrast are partially affected.

When the image is very noisy, it is beneficial to carry out the processing by iteration. The gradient image is, in a first iteration, smoothed (choice of a smoothing operator) by all of the sets of pixels selected. It becomes more coherent and less noisy. The threshold s and the sets of pixels are again determined. The sets of pixels obtained in the second iteration are more appropriate for avoiding diffuse edges.

If one of the coefficients $IC_1$ and $IC_2$ is greater than the threshold s, the processor 100 passes from step E307 to step E308.

In step E308, the processor 100 checks whether the loop consisting of steps E304 to E309 has been iterated a predetermined number of times, for example two or three times.

If the loop consisting of steps E304 to E309 has been iterated a predetermined number of times, the processor 100 passes to step E312, otherwise the processor 100 passes to step E309.

At step E309, the processor 100 determines a new set of pixels.

The sets of pixels used to determine the value of a pixel contain the same N odd number of pixels and thus $(N-1)/2$ pixels are in the first pixel subset and $(N-1)/2$ pixels are in the second pixel subset. The set of pixels may therefore be likened to two one-dimensional subsets. The number of separate sets of pixels depends on N.

According to the invention, the new set of pixels is determined by modifying the direction of at least one pixel subset. The two pixel subsets of the same size are freely oriented about the pivot formed by the target pixel. The number of separate sets of pixels is $4(N-1) \times 4(N-1)$ or $16(N-1)^2$.

According to one particularly advantageous embodiment, associated with each possible set of pixels is a separate index id. The index id is chosen to obtain a simple relationship with the form of the corresponding set of pixels. The two angles $\theta_1$ and $\theta_2$ obtained in step E304 characterize the orientation of the first and second pixel subsets. These angles are converted into orientation indices $O_1$ and $O_2$. Knowing that 360° corresponds to the number orientation index $4(N-1)$, the following equation is obtained: $o_w = \theta_w \cdot 4(N-1)/360$, where $w=1$ or 2. The index id of a set of pixels is defined by $id = O_1 \times 4(N-1) + O_2$.

For example, the angles $\theta_1$ and $\theta_2$ are respectively of 0 and 180°, for the set of pixel of FIG. 4a.

$$O_1 = 0 \cdot 4(5-1)/360 = 0$$

and $$O_2 = 180 \cdot 4(5-1)/360 = 8.$$

The index id of the set of pixels of FIG. 4a is defined by $id = 0 \cdot 4(5-1) + 8$.

It is therefore easy to determine the index of the new set of pixels as a function of the orientations of the pixel subsets of the current set of pixels.

This equation is non-singular with: $O_1 = id/4(N-1)$ and $O_2 = id \bmod 4(N-1)$, considering the integer division and the modulo. These equivalence equations are used for reorienting the pixel subsets.

It should be pointed out here that the indices of the sets of pixels are stored in a map of the same size as the initial digital image. Each index allows the form of the set, which is used to determine the value of the pixel, to be known in a simple manner. This map is modified at each reorientation of the pixel subsets.

The reorientation of a pixel subset w is carried out according to direction $\theta_{rw}$. The normal to $\theta_{rw}$ written $\theta_{\perp rw}$ is calculated as a function of the orientations of the gradients of the pixel subset $w: I_{\phi i,j}$, using a wheighting function l similar to the function h used for the calculation of intersection intensities $IC_1$ and $IC_2$.

In practice, to calculate $\theta_{\perp rw}$, it is necessary to convert the orientations $I_{\phi i,j}$ into Cartesian coordinates so as to avoid modulo problems when subtracting or adding angles. The calculations are therefore carried out in Cartesian coordinates, i.e. an orientation $I_{\phi i,j}$ becomes a point of coordinates: $x_{i,j} = \cos I_{\phi i,j}$, $y_{i,j} = \sin I_{\phi i,j}$.

Figure 5A:
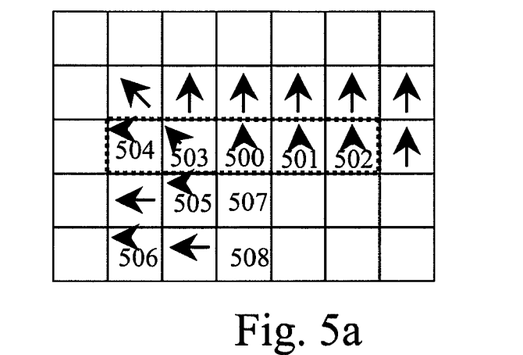
FIGS. 5a to 5c show various selections of a set of pixels according to the present invention.

For example, with reference to example showed by FIG. 5a, target pixel 500 and the second subset of orientation $\theta_2 = 180°$ containing pixels (503, 504) are taken into account. The following gradients orientations can be observed: $I_{\phi 500} = 90°$, $I_{\phi 503} = 135$, and, $I_{\phi 504} = 180°$ or in Cartesian coordinates $[x_{500}, y_{500}] = [\cos(90°), \sin(90°)]$, $[x_{503}, y_{503}] = [\cos(135°), \sin(135°)]$ and, $[x_{504}, y_{504}] = [\cos(180°), \sin(180°)]$.

The Cartesian coordinates of $\theta_{r2}$, $x_{\perp r2}$ and $y_{\perp r2}$ are calculated by using the weighting function l: $x_{\perp r2} = l(0)x_{500} + l(1)x_{503} + l(2)x_{504}$ and $y_{\perp r2} = l(0)y_{500} + l(1)y_{503} + l(2)y_{504}$.

The function l is defined, for example, by the weighting coefficients $\{6/11, 4/11, 1/11\}$ defining a half-Gaussian function. The orientation is simply calculated with $\theta_{\perp r2} = \arctan(y_{\perp r2}/x_{\perp r2})$. The orientation $\theta_{r2}$ is deduced with $\theta_{\perp r2} h \theta_{r2} = \theta_{\perp r2} + 90°$.

The data processing function atan2, in accordance with the SVID 3, POSIX, BSD 4.3 and ISO 9899 standards, is preferably used for calculating the arctangent mathematical function. It should be pointed out here that it is possible for 0, to be calculated automatically by the equation $\theta_{rw} = \operatorname{atan} 2(-x_{\perp rw}, y_{\perp rw})$. The reorientation of a subset w is therefore carried out according to the orientation given by $\theta_{rw}$.

Thus, the reorientation of the subsets according to the angles $\theta_{r_1}$ for the first subset and $\theta_{r_2}$, for the second subset is carried out after the following steps:
1. Calculation of the orientation indices $O_1$ and $O_2$ from the index id of the initial set of pixels according to the equations described above;
2. Calculation of the angles $\theta_{r_1}$ et $\theta_{r_2}$.
3. Conversion of the angles $\theta_{r_1}$ and $\theta_{r_2}$ into orientation indices $O_{r_1}$ et $O_{r_2}$; and
4. Calculation of the new index for the set of pixels by $$id = O_{r1} \cdot 4(N-1) + O_{r2}.$$

When the new set of pixels has been determined, the processor 100 passes to step E304, described above.

In step E312, the processor 100 checks whether the values of the intersection intensities calculated during the various iterations for the same target pixel are similar. This case appears when the direction and/or the norm of a gradient of a pixel is isolated from that or those of its contiguous pixels.

If the values of the intersection intensities are not similar, the processor 100 passes to step E310, described above.

If the values of the intersection intensities are similar, the processor 100 passes to step E313. With the determination of the sets of pixels described in step E309, it happens that sets of pixels do not converge on negligible intersection intensities. These are singular pixels such as, for example, an isolated pixel of an intensity different from its immediate surroundings. The value of this pixel must not be determined from the value of the neighbouring pixels.

In step E313, the processor 100 determines another set of pixels.

Step E313 is identical to step E309 except that at least one of the pixel subsets is, in addition to being reoriented, reduced by at least one pixel, that is, in this case, chosen (selected) as the pixel or pixels furthest away from the target pixel.

Once this operation has been carried out, the processor 100 passes to step E304, described above.

Figure 5B:
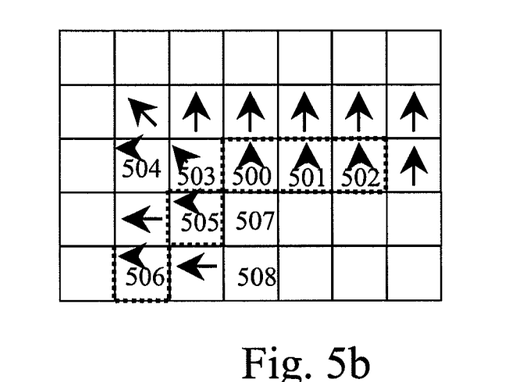
Figure 5C:
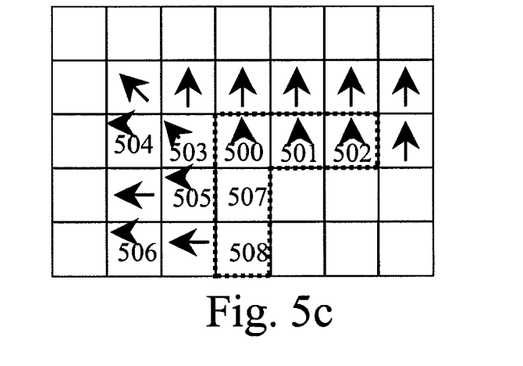

FIGS. 5a to 5c show various selections of a set of pixels according to the present invention.

The three grids of FIGS. 5a to 5c illustrate one and the same image with two grey levels and the associated gradients.

The arrows in bold represent the directions of the gradients, the norm of which is greater than the threshold s described with reference to FIG. 3.

In FIG. 5, the set consisting of the pixels denoted by 500 to 504 is the set of pixels as obtained in step E303 of FIG. 3.

The set of pixels consists of the target pixel 500, the value of which is to be determined, a first subset consisting of pixels 501 and 502 and a second subset consisting of pixels 503 and 504.

The directions of the first and second pixel subsets are opposed and orthogonal to the gradient of the pixel 500 the value of which is to be calculated.

The coefficient $IC_1$ is zero, whereas the coefficient IC2 is not lower than the threshold s. A new set of pixels is therefore determined in step E309. The new set of pixels is represented in FIG. 5b.

The new set of pixels consists of the pixel 500, the value of which is to be determined, the first subset consisting of pixels 501 and 502 and a second subset consisting of pixels 505 and 506.

The coefficient $IC_1$ is zero whereas the coefficient IC2 is not lower than the threshold s. Another set of pixels is therefore determined in step E309. The new set of pixels is represented in FIG. 5c.

The new set of pixels consists of the pixel 500, the value of which is to be determined, the first subset consisting of pixels 501 and 502 and a second subset consisting of pixels 507 and 508.

The coefficients $IC_1$ and IC2 are zero and this set of pixels contains the pixels the values of which are intended to be used to determine the value of the pixel 500.

The invention claimed is:

1. A method of identifying a set of pixels the values of which are to be used in image processing to determine the value of a target pixel, the pixels being pixels of a digital image, wherein the method comprises:
    determining gradients for a plurality of pixels lying close to the target pixel, each gradient being defined by a direction;
    obtaining a plurality of sets of pixels from the plurality of pixels lying close to the target pixel, each set of pixels of the plurality of sets of pixels comprising only the target pixel and at least two pixel subsets, the at least two pixel subsets comprising a first pixel subset formed of a line of pixels extending along a first direction and a second pixel subset formed of a line of pixels extending along a second direction, each pixel of each obtained set of pixels being contiguous with another pixel in the same obtained set of pixels;
    obtaining a first measure and a second measure, the first measure being a measure of an angle difference between the first direction and the gradient of at least one pixel of the first pixel subset, the second measure being a measure of an angle difference between the second direction and the gradient of at least one pixel of the second pixel subset; and
    determining whether the obtained set of pixels is the set of pixels, the values of which are to be used to determine the value of the target pixel, in accordance with the first and second measures.

2. A method according to claim 1, wherein the obtained set of pixels is determined to be the set of pixels, the values of which are to be used to determine the value of the target pixel, in accordance with the first and second measures by checking if the angle between the direction of the gradient of each pixel of the first pixel subset and the normal of the direction of the first pixel subset has a value lower than a threshold and if the angle between the direction of the gradient of each pixel of the second pixel subset and the normal of the direction of the second pixel subset has a value lower than the threshold.

3. A method according to claim 2, wherein each gradient is defined by a norm and the method further includes the step of determining the threshold from the norms of the gradients determined.

4. A method according to claim 3, wherein the pixel-set obtaining step comprises the steps of:
    selecting a first set of pixels from the plurality of sets of pixels, the directions of the first and second pixel subsets being opposed and orthogonal to the gradient of the target pixel;
    calculating, for each pixel of the first pixel subset of the first set of pixels, a coefficient from the norm of the gradient of the pixel and from the angle between the direction of the gradient of the pixel and the normal of the direction of the first pixel subset;
    calculating a coefficient associated with the first pixel subset of the first set of pixels from the coefficients calculated for each pixel of the first pixel subset of the first set of pixels;
    comparing the coefficient associated with the first pixel subset of the first set of pixels with the threshold; and
    selecting, if the coefficient associated with the first pixel subset of the first set of pixels is greater than the threshold, a second set of pixels of the plurality of pixels, the direction of the first pixel subset of the second set of pixels being different from the direction of the first pixel subset of the first set of pixels.

5. A method according to claim 4, the pixel-set obtaining step further comprising the steps of:
    calculating, for each pixel of the second pixel subset of the first set of pixels, a coefficient from the norm of the gradient of the pixel and from the angle between the direction of the gradient of the pixel and the normal of the direction of the second pixel subset of the first set of pixels;
    calculating a coefficient associated with the second pixel subset of the first set of pixels from the coefficients calculated for each pixel of the second pixel subset of the first set of pixels;
    comparing the coefficient associated with the second pixel subset of the first set of pixels with the threshold; and
    selecting, if the coefficient associated with the second pixel subset of the first set of pixels is greater than the threshold, the second set of pixels, the direction of the second pixel subset of which is different from the direction of the second pixel subset of the first set of pixels.

6. A method according to claim 5, further comprising the steps of:
    calculating the value of an angle associated with the first pixel subset of the first set of pixels from the direction of the gradient of each pixel of the first pixel subset of the first set of pixels; and
    calculating the value of an angle associated with the second pixel subset of the first set of pixels from the direction of the gradient of each pixel of the second pixel subset of the first set of pixels, wherein the second set of pixels is selected from the values of the angles associated with the first and second pixel subsets of the first set of pixels.

7. A method according to claim 6, wherein an index is associated with each set of pixels, and the second set of pixels selected is the set of pixels whose index corresponds to a value calculated from the values of the angles associated with the pixel subsets of the first set of pixels.

8. A method according to claim 1, wherein the pixels subsets of the first set of pixels contain the same number of pixels.

9. A method according to claim 4, wherein the calculating and the selecting steps are iterated at most a predetermined number of times for the target pixel.

10. A method according to claim 9, wherein, if the calculating and the selecting steps are carried out the predetermined number of times for the target pixel, and, if the coefficients associated with the pixel subsets of the first set of pixels have a predetermined similarity between the iterations, the method further includes the step of reducing the number of pixels within at least one of the subsets of the first set of pixels.

11. A method according to claim 1, wherein the set of pixels includes at least a third and a fourth pixel subset, the third pixel subset extending along a third direction and the fourth pixel subset extending along a fourth direction, and wherein the set of pixels is identified as the set of pixels, the values of which are to be used to determine the value of the target pixel, if the angle between the direction of the gradient of each pixel of the third pixel subset and the normal of the direction of the third pixel subset has a value lower than a threshold and if the angle between the direction of the gradient of each pixel of the fourth pixel subset and the normal of the direction of the fourth pixel subset has a value lower than the threshold.

12. A method according to claim 1, wherein a pixel of the first pixel subset and a pixel of the second pixel subset are contiguous with the target pixel.

13. A method according to claim 12, wherein the direction along which the first pixel subset extends is determined from the target pixel, and wherein the direction along which the second pixel subset extends is determined from the target pixel.

14. A method according to claim 1, further comprising the step of determining the value of the target pixel from the values of the pixels of the set of pixels determined to be the set, the values of which are to be used to determine the value of the target pixel, in accordance with the first and second measures.

15. A method according to claim 1, wherein the method is carried out for each pixel of the digital image.

16. A method according to claim 1, wherein the first and second directions are non-opposed directions.

17. A method of restoring a digital image comprising a set of pixels represented on a plurality of grey levels, comprising, for at least one target pixel, the steps of:
    identifying a set of pixels, the values of which are to be used to determine the value of the target pixel, by applying an identification method according to any one of claims 1 to 16; and
    determining the value of the target pixel from the values of the pixels of the set of pixels determined to be the set, the values of which are to be used to determine the value of the target pixel, in accordance with the first and second measures.

18. A device for identifying a set of pixels the values of which are to be used in image processing to determine the value of a target pixel, the pixels being pixels of a digital image, wherein the device comprises:
    means for determining gradients for a plurality of pixels lying close to the target pixel, each gradient being defined by a direction;
    means for obtaining a plurality of sets of pixels from the plurality of pixels lying close to the target pixel, each set of pixels of the plurality of sets of pixels comprising only the target pixel and at least two pixel subsets, the at least two pixel subsets comprising a first pixel subset formed of a line of pixels extending along a first direction and a second pixel subset formed of a line of pixels extending along a second direction, each pixel of each obtained set of pixels being contiguous with another pixel in the same obtained set of pixels; and
    means for obtaining a first and a second measure, the first measure being a measure of an angle difference between the first direction and the gradient of at least one pixel of the first pixel subset, the second measure being a measure of an angle difference between the second direction and the gradient of at least one pixel of the second pixel subset,
    means for determining whether the obtained set of pixels is the set of pixels, the values of which are to be used to determine the value of the target pixel, in accordance with the first and second measures.

19. A non-transitory computer-readable storage medium storing a program that includes instructions for implementing a method of identifying a set of pixels the values of which are to be used in image processing to determine the value of a target pixel, the pixels being pixels of a digital image, wherein the method comprises the steps of:
    determining gradients for a plurality of pixels lying close to the target pixel, each gradient being defined by a direction;
    obtaining a plurality of sets of pixels from the plurality of pixels lying close to the target pixel, each set of pixels of the plurality of sets of pixels comprising only the target pixel and at least two pixel subsets, the at least two pixel subsets comprising a first pixel subset formed of a line of pixels extending along a first direction and a second pixel subset formed of a line of pixels extending along a second direction, each pixel of each obtained set of pixels being contiguous with another pixel in the same obtained set of pixels;
    obtaining a first and a second measure, the first measure being a measure of an angle difference between the first direction and the gradient of at least one pixel of the first pixel subset, the second measure being a measure of an angle difference between the second direction and the gradient of at least one pixel of the second pixel subset; and
    determining whether the obtained set of pixels is the set of pixels, the values of which are to be used to determine the value of the target pixel, in accordance with the first and second measures.

20. A device configured to identify a set of pixels the values of which are to be used in image processing to determine the value of a target pixel, the pixels being pixels of a digital image, wherein the device comprises a controller configured to:
    determine gradients for a plurality of pixels lying close to the target pixel, each gradient being defined by a direction;
    obtain a plurality of sets of pixels, from the plurality of pixels lying close to the target pixel, each set of pixels of the plurality of sets of pixels comprising only the target pixel and at least two pixel subsets, the at least two pixel subsets comprising a first pixel subset formed of a line of pixels extending along a first direction and a second pixel subset formed of a line of pixels extending along a second direction, each pixel of each obtained set of pixels being contiguous with another pixel in the same obtained set of pixels;

obtain a first and a second measure, the first measure being a measure of an angle difference between the first direction and the gradient of at least one pixel of the first pixel subset, the second measure being a measure of an angle difference between the second direction and the gradient of at least one pixel of the second pixel subset; and determining whether obtained the set of pixels is the set of pixels, the values of which are to be used to determine the value of the target pixel, in accordance with the first and second measures, wherein at least one of the gradient determining function, the pixel-set determining function, and the obtaining functions of the controller is implemented by a processor.

* * * * *